(No Model.)

F. RHIND.
ARGAND LAMP.

No. 387,258. Patented Aug. 7, 1888.

WITNESSES:
Ira R. Steward.
L. L. Duerden.

INVENTOR.
Frank Rhind.
BY
W. W. Canfield.
ATTORNEY.

UNITED STATES PATENT OFFICE.

FRANK RHIND, OF MERIDEN, CONNECTICUT, ASSIGNOR OF ONE-HALF TO CHARLES S. UPTON, OF NEW YORK, N. Y.

ARGAND LAMP.

SPECIFICATION forming part of Letters Patent No. 387,259, dated August 7, 1888.

Application filed December 15, 1887. Serial No. 257,940. (No model.)

*To all whom it may concern:*

Be it known that I, FRANK RHIND, a citizen of the United States, and a resident of Meriden, in the county of New Haven and State of Connecticut, have invented certain new and useful Improvements in Argand Lamps, of which the following is a specification.

The object of this improvement is to provide for a perfect distribution of the air to the inner surface of the flame in Argand or circular lamp burners, and to a certain extent heat the air before it is directed upon the flame.

The invention consists of the construction, arrangement, and combination of parts hereinafter described and claimed.

Figure 1:
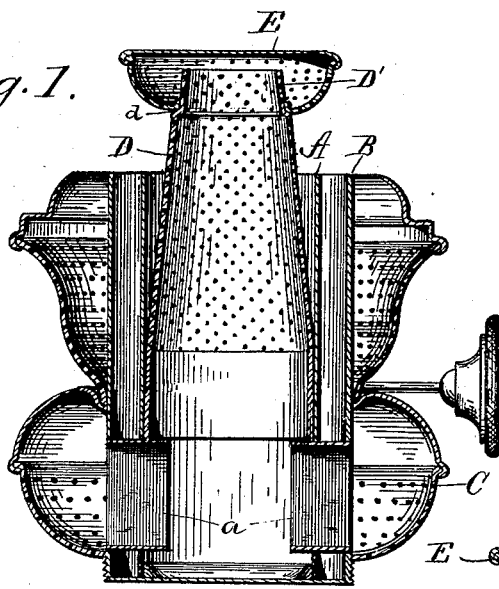
Figure 4:
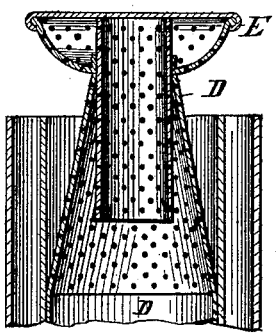
Figure 3:
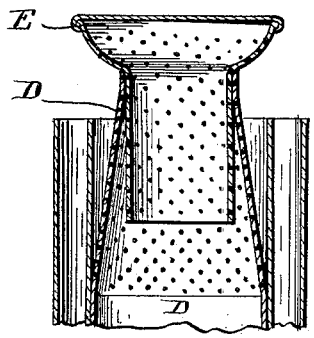
Figure 2:
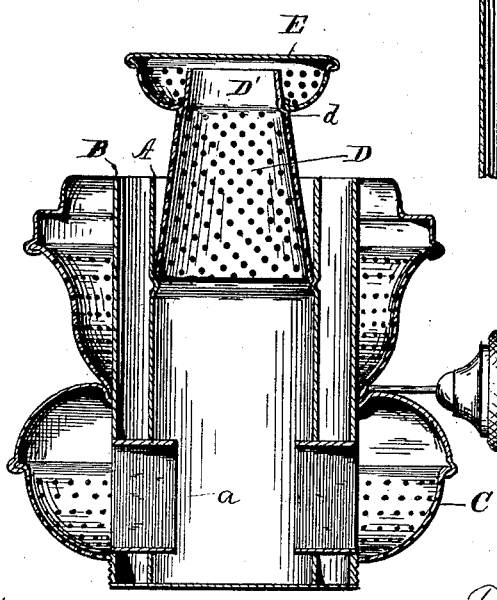

Figure 1 is a central vertical section of an Argand burner provided with my improvement. Figs. 2, 3, and 4 are similar sections showing modifications thereof.

A designates the central tube, and B the outer tube, the space between said tubes forming the wick-chamber.

C is the ordinary basket or casing surrounding the tubes $a$, which form passages for the air to the inner tube. This casing is perforated, as shown. All these parts are of the usual construction.

Within the central tube is placed a perforated truncated cone, D, which rests upon any proper support within the central tube and may extend to near the bottom thereof or be supported at any point between the tubes $a$ and the top of the central tube, as shown in Fig. 2. The upper end of this cone is cut away and is contracted a short distance from the top, forming a shoulder, $d$, and that portion D' of the cone extending above the shoulder is substantially straight or tubular in form and open at the top. This tubular portion may be perforated, as shown in Fig. 1, or solid, as shown in Fig. 2.

Upon the top of cone D and resting upon the shoulder $d$ is placed a hollow button or spreader, E, the upper portion or top of which is closed and the lower part open. This opening is provided with an upturned flange which fits closely the tubular portion of cone D'. The lower or side walls of the spreader are perforated, as shown, and it may be removed from the cone D' at pleasure, being held in place by frictional contact. The tubular portion D' of the cone D extends up within the hollow air spreader and distributer a certain determined distance, preferably about three-quarters of the distance from the bottom to the top of the air-chamber within said distributer. The top of this spreader and distributer may be perforated, if desired, and it may be held in place by a perforated tube attached to its top and extending down within the tube D', as shown in Fig. 4; or, if preferred, the extension D' within the air-spreader may be omitted and the spreader may be provided with a downwardly-extending tubular portion which fits within the cone D and holds the spreader in place, as shown in Fig. 3.

The operation is as follows: The air which enters through tubes $a$ passes up within cone D, and a portion thereof passes out through the perforations in said cone below the air spreader and distributer E and to the base of the flame, while the remainder passes up into the distributer and out through the perforations therein in finely-divided jets into the flame. That portion of the air which enters the distributer through the tube D' is highly heated before coming in contact with the flame by reason of its passage through said tube, being compelled to pass through the restricted space between the tubular extension D' of the cone D and the heated top of the distributer, or through the perforations in said tube D', and coming in contact with the top of the distributer and being retained in said distributer a short time before passing through the perforations therein, all of these parts being highly heated by the flame of the burner. The spreader E being removable, these parts may be easily cleaned whenever it becomes necessary. With this construction there is a perfect distribution of air to the inner mantle of flame. The flame being enlarged or spread by the distributer and the air passing through the perforations in the cone D and said distributer in finely-divided jets, the oxygen of the air readily mingles with the carbon of the burning gases, and a clear white and steady flame is produced. The heating of the air, as hereinbefore described, also aids in this result, as it is well known that the carbon in burning gases and the oxygen of the air unite more readily when the latter is at a high temperature, and that a more perfect combustion of the gases is thus produced.

The application of my improvement is not limited to the form of Argand burner shown, as it is evident that it may be applied to any form of circular-burner or Argand lamp.

Having thus fully described my invention, its construction, and operation, what I claim, and desire to secure by Letters Patent of the United States, is—

1. The combination, with the central tube of an Argand lamp, of a perforated cone, the base of which fits said tube, the top being open and formed into a tube, as D', said cone being provided with a removable hollow spreader and distributer, the top of which is closed and the bottom open, the side walls being perforated and the lower opening being so formed as to fit the tube D', which extends up within said spreader and distributer, substantially as shown and described.

2. The combination, with the central tube of an Argand lamp, of a perforated cone, D, the top thereof being open and formed into a tube, D', which is perforated, said cone being provided with a removable hollow spreader and distributer, the top of which is closed and the bottom open, the side walls being perforated and the lower opening being so formed as to fit the perforated tube D', which extends up within said spreader and distributer, substantially as shown and described.

3. The combination, with the central tube of an Argand lamp, of a perforated cone, D, the base of which fits the inner wall of said tube, and an air distributer and spreader, E, said cone and distributer being provided one with an opening and the other with a tube which fits within said opening, and whereby the distributer is held in place on the top of said cone, substantially as shown and described.

Signed at Meriden, in the county of New Haven and State of Connecticut, this 13th day of December, A. D. 1887.

FRANK RHIND.

Witnesses:
GEO. L. COOPER,
S. J. ROBY.